United States Patent Office 3,247,182
Patented Apr. 19, 1966

3,247,182
HENEICOSAPEPTIDES AND INTERMEDIATES
FOR THE MANUFACTURE THEREOF
Robert Schwyzer and Beat Iselin, Riehen, Heini Kappeler, Birsfelden, and Werner Rittel and Peter Sieber, Basel, all in Switzerland, assignors to Ciba Corporation, a corporation of Delaware
No Drawing. Filed Nov. 15, 1961, Ser. No. 152,654
Claims priority, application Switzerland, Nov. 17, 1960, 12,904/60
16 Claims. (Cl. 260—112.5)

The present invention provides a new heneicosapeptide of the formula L-seryl-L-tyrosyl-L-seryl-L-methionyl-L-glutaminyl - L-histidyl-L-phenylalanyl-L-arginyl-L-tryptophyl-glycyl-L-lysyl-L-prolyl-L-valyl-glycyl-L-lysyl-L-lysyl-L-arginyl-L-arginyl-L-prolyl-L-valyl-L-lysine as well as the corresponding compound containing the radical of glutamic acid instead of the glutaminyl radical, and their derivatives and acid addition salts and a process for their manufacture.

Relevant derivatives are above all functional derivatives such as esters, for instance those of lower, alkanols, especially methanol, ethanol, propanol, tertiary butanol or of lower aralkanols, especially benzyl alcohol, para-nitrobenzyl-alcohol; further amides and hydrazides, as well as N-substitution products such as N-acyl, more especially N-acetyl derivatives, and compounds containing the conventional amino protective groups, in the first place the carbobenzoxy group, the tertiary butyloxy carbonyl group, the trityl group and colored groups for instance the p-phenylazolbenzyloxy carbonyl group.

The new compounds are highly active adrenocorticotropics and are therefore intended for use as medicaments in the human and veterinary medicine. However, their effectiveness has not yet been proven in human therapy. Furthermore, they can be used as intermediates for the manufacture of medicaments containing a longer chain of amino acids, such as the adrenocorticotropic hormones themselves.

The new heneicosapeptides are obtained by the methods known for the manufacture of peptides, the amino acids being linked together in the abovementioned order of succession singly or in the form of smaller, previously formed peptide units. Thus, one of the amino acid or peptide molecules in the form of an ester can be linked with a further amino acid or peptide molecule containing a protected amino group, in the presence of a condensing agent such as a carbodiimide or a phosphorous acid ester halide; or the amino acid or peptide ester containing a free amino group can be reacted with an amino acid or with a peptide containing an activated carboxyl group (and a protected amino group), for example with an acid halide, azide, anhydride, imidazolide, an enol ester according to Woodward [J. Am. Chem. Soc. 89, 1011 (1961)] or with an activated ester such as cyanomethyl ester or carboxymethyl thiol ester. Conversely, an amino acid or a peptide containing a free carboxyl group (and a protected amino group) can be reacted with an amino acid or with a peptide containing an activated amino group (and a protected carboxyl group), for example with a phosphiteamide. All aforementioned methods are suitable for the formation of all peptide linkages covered by the present invention, but the processes described in the examples are particularly advantageous.

As mentioned above there are various possibilities of synthesising the heneicosapeptide from the individual amino acids or smaller peptide units. According to one process, for example, the nonadecapeptide L-seryl-L-tyrosyl-L-seryl-L-methionyl-L-glutaminyl-(or glutamyl)-L - histidyl - L - phenylalanyl - L - arginyl-L-tryptophyl-glycyl - L - lysyl - L-prolyl-L-valyl-glycyl-L-lysyl-L-lysyl-L-arginyl-L-arginyl-L-proline is condensed with the dipeptide L-valyl-L-lysine, as shown for example in the reaction scheme 1 shown below.

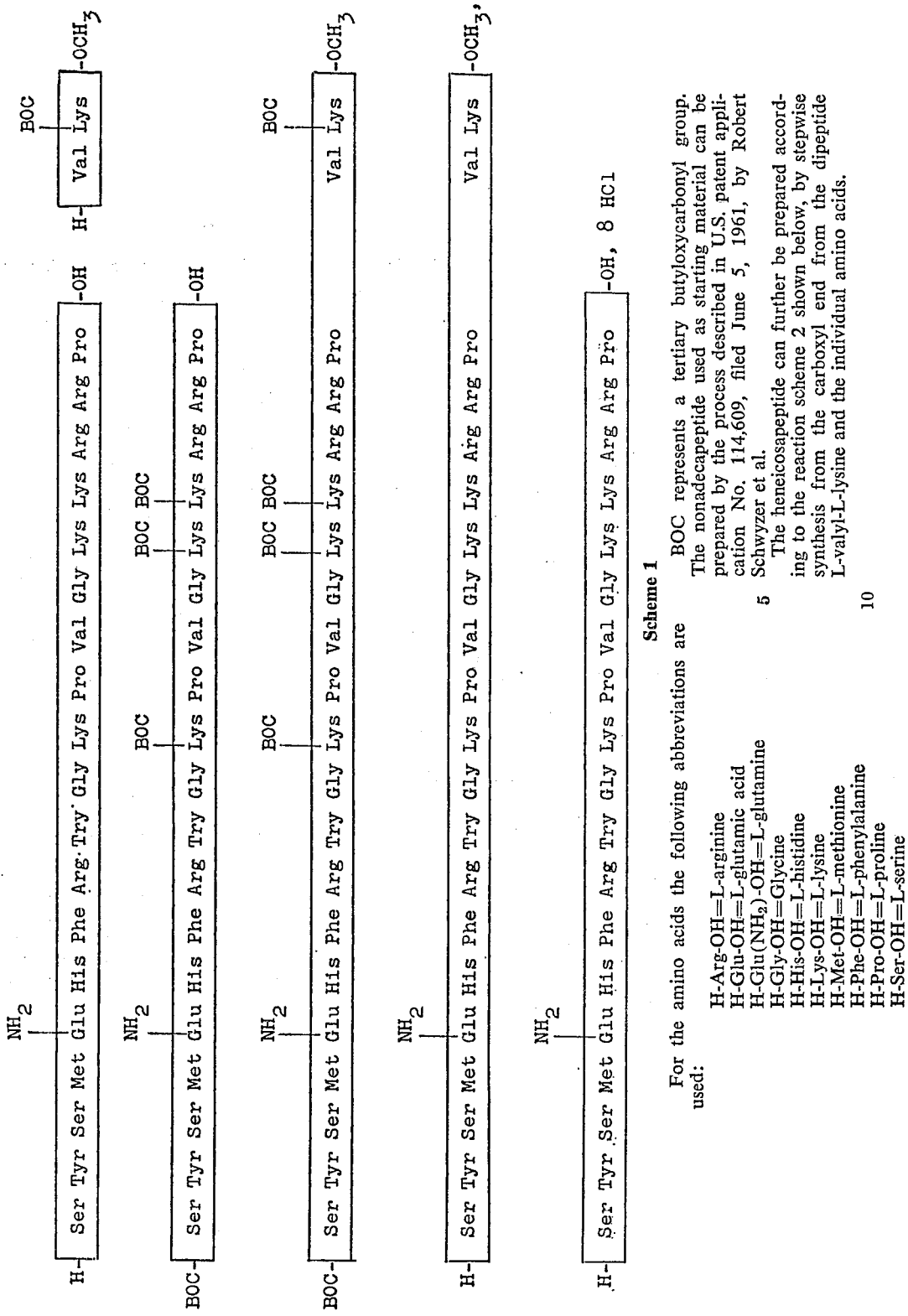

Scheme 1

For the amino acids the following abbreviations are used:

H-Arg-OH=L-arginine
H-Glu-OH=L-glutamic acid
H-Glu(NH₂)-OH=L-glutamine
H-Gly-OH=Glycine
H-His-OH=L-histidine
H-Lys-OH=L-lysine
H-Met-OH=L-methionine
H-Phe-OH=L-phenylalanine
H-Pro-OH=L-proline
H-Ser-OH=L-serine BOC represents a tertiary butyloxycarbonyl group. The nonadecapeptide used as starting material can be prepared by the process described in U.S. patent application No. 114,609, filed June 5, 1961, by Robert Schwyzer et al.

The heneicosapeptide can further be prepared according to the reaction scheme 2 shown below, by stepwise synthesis from the carboxyl end from the dipeptide L-valyl-L-lysine and the individual amino acids.

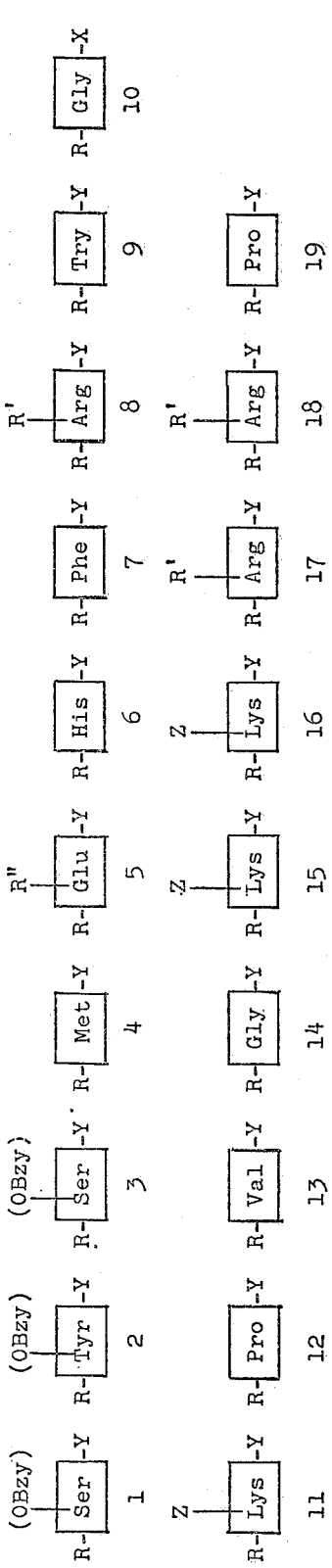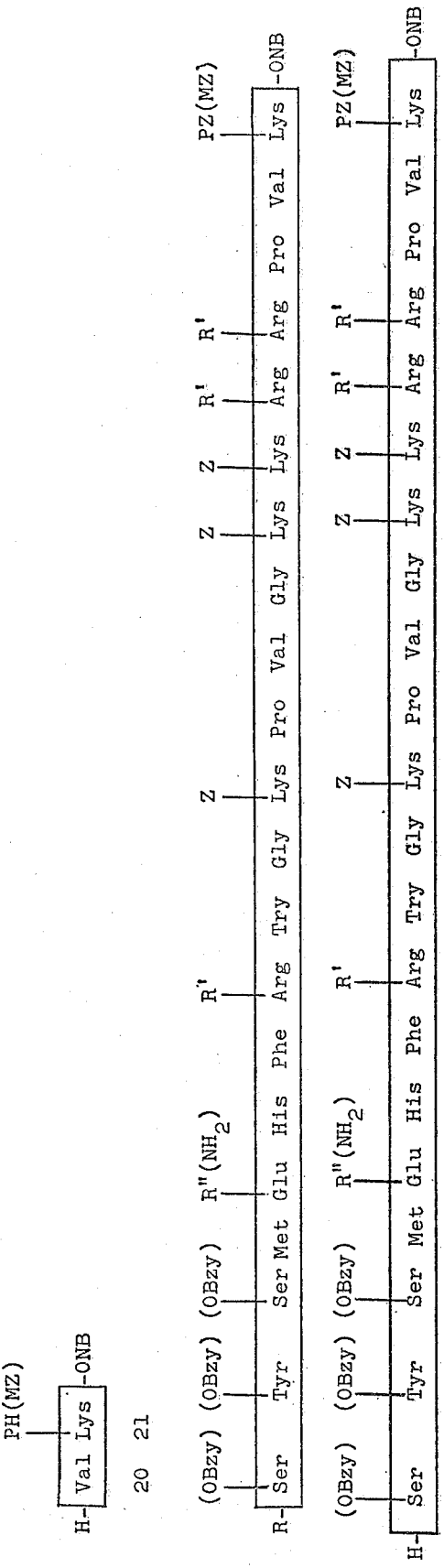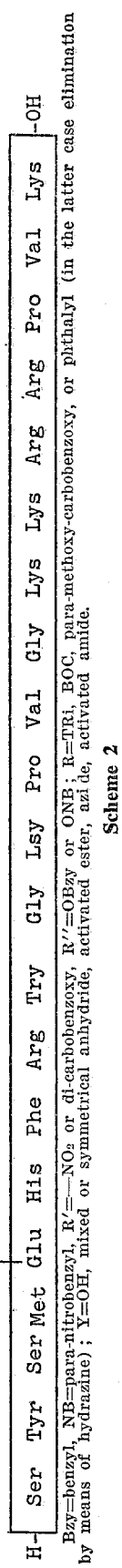
Bzy=benzyl, NB=para-nitrobenzyl, R'=—NO₂ or di-carbobenzoxy, R''=OBzy or ONB; R=TRi, BOC, para-methoxy-carbobenzoxy, or phthalyl (in the latter case elimination by means of hydrazine); Y=OH, mixed or symmetrical anhydride, activated ester, azide, activated amide.
Scheme 2

The dipeptide derivative, L-valyl-N$^\epsilon$-p-phenylazo-benzyloxy carbonyl-L-lysine-para-nitrobenzyl ester, can be prepared for example, by condensing BOC-L-valine with N$^\epsilon$-p-phenylazo-benzyloxycarbonyl-L-lysine-para-nitrobenzyl ester by the carbodiimide or anhydride method.

Any free or functional groups not participating in the reaction are advantageously protected, more especially by means of radicals that are easy to split off by hydrolysis or reduction; thus the carboxyl group preferably by esterification, for example with methanol, tertiary butanol, benzyl alcohol, or para-nitrobenzyl alcohol, or the amino group for example by introducing the trityl radical (=Tri) or the carbobenzoxy group (=Z) or a colored protective group such as the para-phenylazo-benzyloxy-carbonyl group (=PZ) or the para(para'-methoxy-phenylazo)-benzyloxy-carbonyl group (=MZ) or more especially by introducing the tertiary butyloxy carbonyl radical. To protect the amino group in the guanidino grouping of arginine the nitro group is suitable; however, it is not absolutely necessary to protect said amino group of arginine during the reaction.

The conversion of a protected mercapto or amino group into a free group, as well as the conversion of a functionally converted carboxyl group into a free carboxyl group, in the course of the process for the manufacture of the heneicosapeptides and intermediates, is carried out in the usual manner by treatment with a hydrolysing or reducing agent respectively.

The invention further includes any variant of the present process in which an intermediate obtained at any stage of the process is used as starting material and the remaining step or steps is/are carried out, or the process is discontinued at any stage thereof, and it includes also the intermediates so obtained.

Depending on the reaction conditions used the new compounds are obtained in the form of bases or of salts thereof. From the salts the bases can be prepared in as such known manner. When the bases are treated with acids suitable for forming therapeutically useful salts, salts can be prepared, such, for example, as salts with inorganic acids such as hydrohalic acids, for example hydrobromic or hydrochloric acid, nitric acid, thiocyanic acid, sulfuric or phosphoric acid; or with organic acids such as acetic, propionic, glycollic, lactic, pyruvic, oxalic, citric, benzoic, cinnamic, salicylic, 2-phenoxybenzoic, 2-acetoxy-benzoic, mandelic, methanesulfonic, ethanesulfonic, hydroxyethanesulfonic, benzenesulfonic or toluenesulfonic acid.

The heneicosapeptides obtained by the present process can be used in the form of pharmaceutical preparations which contain a peptide in admixture with a pharmaceutical organic or inorganic excipient suitable for enteral or parenteral administration. Suitable excipients are substances that do not react with the polypeptides, such, for example, as gelatine, lactose, glucose, sodium chloride, starch, magnesium stearate, talc, vegetable oils, benzyl alcohols, gums, polyalkylene glycols, white petroleum jelly, cholesterol or other known medicinal excipients. The pharmaceutical preparations may be, for example, tablets, dragees, powders, ointments, creams or suppositories, or in liquid form solutions, suspensions or emulsions. They may be sterilized and/or may contain assistants such as preserving, stabilizing, wetting or emulsifying agents. They may also contain further therapeutically valuable substances.

The following examples illustrate the invention:

*Example 1*

A solution of 27.06 mg. (0.01 mmol) of L-seryl-L-tyrosyl - L - seryl - L - methionyl - L - glutaminyl - L - histidyl - L - phenylalanyl - L - arginyl - L - tryptophyl-glycyl-L-lysyl-L-prolyl-L-valyl-glycyl-L - lysyl - L - lysyl L-arginyl-L-arginyl-L-proline hexaacetate (described in Example 7, of U.S. patent application No. 114,609, filed June 5, 1961, by Robert Schwyzer et al.) in 1 cc. of water is treated with 1 cc. of dioxane and 0.4 cc. of 0.1 N-sodium hydroxide solution and then cooled to 0° C. 8.58 mg. of tertiary butyloxycarbonyl azide (0.06 mmol) are added and then, in the course of 6 hours, 0.6 cc. of 0.1 N-sodium hydroxide solution is stirred in in very small portions. After another 15 hours, the solution is treated with 0.4 cc. of 0.1 N-hydrochloric acid and evaporated in vacuo to dryness, and the residue is dissolved in water and lyophilized. The thoroughly dried, colorless residue is dissolved in 1 cc. of dimethylformamide, treated with 35.9 mg. (0.1 mmol; 10-fold excess) of L-valyl-N$^\epsilon$-tertiary butyloxycarbonyl-L-lysine methyl ester and cooled to —5° C. This solution is mixed with 20.6 mg. of dicyclohexylcarbodiimide and kept for 15 hours.

The solution is then carefully concentrated in vacuo to about half its volume and the concentrate is mixed with 10 liters of dry ethyl acetate, whereupon the heneicosapeptide derivative precipitates as an insoluble colorless powder, while the excess of dicyclohexylcarbodiimide and of dipeptide ester passes into solution. The product is then reprecipitated twice more.

Regardless of the small contamination by dicyclohexyl urea, the compound is dissolved in 0.5 cc. of trifluoroacetic acid and the solution is kept for one hour at room temperature. On evaporation of the solvent, the heneicosapeptide-glu$^5$-$\gamma$-amide-lys$^{21}$-methyl ester-octatrifluoroacetate is obtained in an electrophoretically pure form (paper electrophoresis at 3000 v., pH=1.9). The product displays a considerable corticotropin action. Yield: 95%.

The amide functions and ester functions are hydrolysed by being kept in 0.1 N-hydrochloric acid solution for 24 hours at room temperature, after the trifluoroacetate residues have been exchanged for acetate residues by percolating the solution through a column of Amberlite IR–4B (acetate form). Lyophilisation yields the heneicosapeptide in the form of the octa-hydrochloride (yield: 84%) which displays strong corticotropin action.

The dipeptide derivative, the L-valyl-N$^\epsilon$-tertiary butyloxycarbonyl-L-lysine methyl ester is prepared as follows:

2.51 grams of carbobenzoxy-L-valine and 2.60 grams of N$^\epsilon$-tertiary butyloxycarbonyl-L-lysine methyl ester (Example 3 of U.S. patent application No. 46,893, filed August 2, 1960, by Robert Schwyzer et al.) are dissolved in 50 cc. of acetonitrile and the solution is treated at —5° with 2.06 g. of dicyclohexylcarbodiimide. After 3 hours, 90% of the expected dicyclohexyl urea has precipitated; it is filtered off, the filtrate evaporated to dryness, and the residue is dissolved in ethyl acetate and the solution washed successively with dilute cold hydrochloric acid, potassium carbonate solution and water. The solution is dried with sodium sulfate and evaporated, to yield 4.0 grams (=81% of the theoretical yield) of carbobenzoxy-L-valyl-N$^\epsilon$-tertiary butyloxycarbonyl-L-lysine methyl-ester in the form of a viscous oil.

The carbobenzoxy group is eliminated by hydrogenating 4.0 grams of the above compound in 100 cc. of methanol and 8 cc. of N-acetic acid in the presence of 0.5 gram of a palladium black catalyst containing 10% Pd. When, after 40 minutes, hydrogen is caused to bubble through the solution, carbon dioxide is no longer evolved. The catalyst is filtered off and the filtrate cautiously evaporated in vacuo. The residue is immediately agitated with 10 cc. of ethyl acetate and 10 cc. of concentrated potassium carbonate solution, whereupon the free dipeptide ester dissolves in the organic layer, which is then separated and dried with solid potassium carbonate. Evaporation of the ethyl acetate leaves the L-valyl-N$^\epsilon$-tertiary butyloxycarbonyl-L-lysine methyl ester as a viscous oil which must be further worked up immediately.

*Example 2*

(1) H-Lys(PZ)-OBzy, HCl

A suspension of 3.84 grams of N$^\epsilon$-PZ-lysine in 38 cc.

of absolute tetrahydrofuran is treated with phosgene for one hour at 40° C. The clear solution is evaporated in vacuo at 40° C., and the crystalline residue is heated for 3 minutes at 60° C. with 20 cc. of absolute benzyl alcohol containing 0.73 gram of hydrogen chloride gas, whereupon a clear solution forms. It is cooled to room temperature and then treated with 60 cc. of absolute ether, whereupon the hydrochloride crystallizes out. Yield: 4.19 grams=82% of the theoretical. M.P. 188–190° C. with decomposition. For analytical purposes the product is recrystallized from methanol+ether, whereupon it melts at 191° C. with decomposition. $N^\epsilon$-MZ-L-lysine-benzyl ester hydrochloride, and the corresponding para-nitro-benzyl ester derivative, are prepared in a similar manner. Their further processing follows exactly the pattern used for the working up of the $N^\epsilon$-PZ-L-lysine benzyl ester hydrochloride.

(2) BOC-Val-Lys(PZ)-OBzy

A solution of 2.64 grams of $N^\epsilon$-PZ-lysine benzyl ester hydrochloride in chloroform and a small amount of methanol is shaken at 0° C. with a potassium carbonate solution. The whole is dried with sodium sulfate and evaporated in vacuo at 40° C.; the crystalline residue, together with 1.12 grams of BOC-valine, is dissolved in 14 cc. of acetonitrile, and at 0° C. 1.17 grams of dicyclohexylcarbodiimide are added. The mixture is kept overnight at 0° C. and the thick precipitate is then suctioned off and washed with ice-cold acetonitrile. The peptide is crystallized together with the dicyclohexyl urea. By extraction with dimethylformamide the peptide is separated from the urea; on addition of water it crystallizes from dimethylformamide. Yield: 2.50 grams=72% of the theoretical. The product melts at 154–156° C.

For analysis the product is recrystallized from aqueous ethanol.

(3) H-Val-Lys(PZ)-OBzy, HCl

A solution of 2.02 grams of BOC-valyl-$N^\epsilon$-PZ-lysine benzyl ester in 26 cc. of absolute ethyl acetate is mixed with 40 cc. of 3.3 N-hydrochloric acid in ethyl acetate and the mixture is kept for one hour at room temperature and then evaporated in vacuo at 40° C., whereupon the hydrochloride precipitates in solid form. Yield: 1.78 grams=97% of the theoretical. The product melts at 200–201° C. with decomposition.

(4) BOC-Pro-Val-Lys(PZ)-OBzy 2.8 grams of BOC-Pro-OH are dissolved in 17 cc. of absolute tetrahydrofuran and 1.8 cc. of triethylamine and treated at −15° C. with 1.6 cc. of pivaloyl chloride. The reaction mixture is stirred for 15 minutes at −15° C. In the meantime H-Val-Lys(PZ)-OBzy is prepared from 7.93 grams of H-Val-Lys(PZ)-OBzy, HCl in dimethylformamide and triethylamine and added to the above mixed anhydride. The mixture is kept overnight at 0° C., is then diluted with ethyl acetate and extracted at 0° C. with dilute hydrochloric acid and sodium bicarbonate solution. After evaporation of the solvent, the residue is recrystallized from a mixture of ethanol and water. Yield 8.8 grams=88% of the theoretical; M.P. 123–125° C.

(5) H-Pro-Val-Lys(PZ)-OBzy, HCl

The tripeptide derivatives is obtained by decarbobenzoxylation as described under (3). After recrystallization from a mixture of methanol and ether, the substance melts at 218–219° C.

(6) BOC-Arg($Z_2$)-Pro-Val-Lys(PZ)-OBzy 1.15 grams of $N^\alpha$-BOC-$N^\epsilon$-di-carbobenzoxy-L-arginine are dissolved in 11 cc. of absolute tetrahydrofuran and 0.29 cc. of triethylamine. 0.28 cc. of chlorocarbonic acid isobutyl ester is added at −15° C. and the mixture stirred for 15 minutes at this temperature. A solution of 1.00 gram of H-Pro-Val-Lys(PZ)-OBzy, HCl in 4 cc. of absolute dimethylformamide and 0.2 cc. of triethylamine is then added. After the reaction mixture has been stirred for one hour at 0° C., it is allowed to stand overnight at 0° C., then diluted with ethyl acetate, washed at 0° C. with hydrochloric acid and sodium bicarbonate, dried and the solvent evaporated under reduced pressure. The $N^\alpha$-BOC-$N^\epsilon$-dicarbobenzoxy-Arg-Pro-Val-Lys(PZ)-benzyl ester consists of a solid, uncrystallizable foam. Yield: 1.69 grams=100% of the theoretical.

The product is unitary according to thin-layer chromatography; in the system chloroform-acetone (7:3) Rf 0.53 and in benzene-acetone (1:1) Rf 0.67.

(7) H-Arg($Z_2$)-Pro-Val-Lys(PZ)-OBzy 1.2 grams of BOC-tetrapeptide ester are allowed to stand for 10 minutes with 7.5 cc. of trifluoracetic acid; after the trifluoracetic acid has been evaporated, the oil is dissolved in chloroform, washed at 0° C. with water and then with potassium carbonate solution, dried and the solvent evaporated under reduced pressure. There are obtained 990 mg.=90% of the theoretical of a solid orange foam. The substance is unitary according to thin-layer chromatography; in the system benzene-acetone (1:1) Rf 0.09 and dioxane-water (9:1) Rf 0.71.

(8) BOC-Arg($Z_2$)-Arg($Z_2$)-Pro-Val-Lys(PZ)-OBzy

The above pentapeptide derivative is prepared from 1.72 grams of BOC-Arg($Z_2$) and 2.175 grams of H-Arg($Z_2$)-Pro-Val-Lys(PZ)-OBzy in a manner analogous to that described under (6). Yield: 3.12 grams=97% of the theoretical.

Thin-layer chromatogram: In benzene-acetone (1:1) Rf 0.71; in chloroform-acetone (7:3) Rf 0.57.

(9) H-Arg($Z_2$)-Arg($Z_2$)-Pro-Val-Lys(PZ)-OBzy

From the above 3.12 grams of BOC-pentapeptide derivative the BOC group is split off as described under (7). Yield: 2.90 grams=99% of the theoretical.

Thin-layer chromatogram: Unitary, Rf 0.48 in benzene-acetone (1:1) and 0.18 in chloroform-acetone (7:3).

(10) BOC-Lys(Z)-Arg($Z_2$)-Arg($Z_2$)-Pro-Val-Lys(PZ)-OBzy 587 mg. of the product described under (9) are reacted with 235 mg. of BOC-Lys(Z)-OH in the manner described under (6). The crude product is precipitated from tetrahydrofuran and ether. Yield: 725 mg.=100% of the theoretical.

Thin-layer chromatogram: In benzene-acetone (1:1) Rf 0.68, in chloroform-acetone (7:3) Rf 0.36.

(11) H-Lys(Z)-Arg($Z_2$)-Arg($Z_2$)-Pro-Val-Lys(PZ)-OBzy

The BOC group is split off from 614 mg. of BOC hexapeptide in a manner analogous to that described under (7). Yield: 574 mg.=99%.

Thin-layer chromatogram: Benzene-acetone (1:1) Rf 0.38; chloroform-acetone (7:3) Rf 0.11.

(12) BOC-Lys(Z)-Lys(Z)-Arg($Z_2$)-Arg($Z_2$)-Pro-Val-Lys(PZ)-OBzy 3.26 grams of H-Lys(Z)-Arg($Z_2$)-Arg($Z_2$-Pro-Val-Lys(PZ)-OBzy and 1.19 grams of BOC-Lys(Z)-nitrophenyl ester are stirred in 7 cc. of absolute terahydrofuran at 40° C. overnight. The thick mixture is dissolved in a little dimethylformamide and added dropwise to 300 cc. of a mixture of ether and petroleum ether (2:1). The precipitate is suction-filtered and washed well with ether. Yield: 3.45 grams=88%.

Thin-layer chromatogram: Benzene-acetone (1:1) Rf 0.57 unitary; chloroform-acetone (7:3) Rf 0.22 unitary.

(13) H-Lys(Z)-Lys(Z)-Arg($Z_2$)-Arg($Z_2$)-Pro-Val-Lys(PZ)-OBzy

From the above 3.45 grams of peptide derivative the BOC group is split off as described under (7). Yield: 3.20 grams=97% of the theoretical.

Thin-layer chromatogram: benzene-acetone (1:1) Rƒ 0.32; chloroform-acetate (7:3) Rƒ 0.09.

(14) BOC-Val-Gly-Lys(Z)-Lys(Z)-Arg(Z₂)-Pro-Val-Lys(PZ)-OBzy

From the above 3.20 grams of heptapeptide derivative and 686 mg. of BOC-Val-Gly-OH the protected nonapeptide ester is prepared according to the process described under (6). It is purified by preciptation from dimethylformamide+ether. Yield: 2.92 grams=81% of the theoretical.

Thin-layer chromatogram: Benzene-acetone (1:1) Rƒ 0.34; dioxane Rƒ 0.72.

The BOC-Val-Gly-OH is prepared as follows:

BOC-Val-Gly-OEt is prepared from 5 grams of BOC-valine and 3.54 grams of glycine ethyl ester hydrochloride by the method described under (4). Yield: 4.45 grams=64% of the theoretical; M.P. 95–96° C. after crystallization from ligroin.

4.3 grams of the ethyl ester are hydrolyzed in 80 cc. of dioxane with 32 cc. of 0.5 N-sodium hydroxide solution for 30 minutes. After the solvent has been evaporated, the reaction mixture is covered with ethyl acetate, acidified at 0° C. with concentrated hydrochloric acid and extracted with ethyl acetate. The extract is washed neutral and evaporated to leave 3.90 grams of a resin=100% of the theoretical.

The dicyclohexylamine salt thereof crystallizes; M.P. 167–169° C.

(15) H-Val-Gly-Lys(Z)-Lys(Z)-Arg(Z₂)-Arg(Z₂)-Pro-Val-Lys(PZ)-OBzy

From 2.92 grams of the BOC-nonapeptide ester the BOC group is split off as described under (7). Yield: 2.54 grams=91% of the theoretical.

Thin-layer chromatogram: Chloroform-methanol (9:1) Rƒ 0.4.

(16) BOC-Pro-Val-Gly-Lys(Z)-Lys(Z)-Arg(Z₂)-Pro-Val-Lys(PZ)-OBzy 2.985 grams of nonapeptide ester are reacted with 466 mg. of BOC-proline by the method described under (6). The resulting crude product is precipitated from a mixture of dimethyl-formamide, ether and petroleum ether. Yield: 2.70 grams=83% of the theoretical.

Thin-layer chromatogram: Chloroform-methanol (9:1) Rƒ 0.9.

(17) H-Pro-Val-Gly-Lys(Z)-Lys(Z)-Arg(Z₂)-Arg(Z₂)-Pro-Val-Lys(PZ)OBzy 2.30 grams of BOC-decapeptide ester are treated with trifluoroacetic acid as described under (5). Yield: 2.108 grams=96% of the theoretical.

Since thin-layer chromatography can only be carried out with difficulty owing to decreasing solubility, the following method is used as a test of purity:

A few mg. of the above substance are dissolved in dimethylformamide, treated with 1 drop of triethylamine and a few mg. of 2:4-dinitrofluorobenzene. The reaction mixture is allowed to stand overnight at room temperature, the dinitrophenylpeptide precipitated with ether, centrifuged and totally hydrolysed with hydrochloric acid. The dinitrophenylamino acids are subjected to chromatographic examination. Only ether-soluble dinitrophenylproline is found.

(18) BOC-Lys(Z)-Pro-Val-Gly-Lys(Z)-Lys(Z)-Arg(Z₂)-Arg(Z₂)-Pro-Val-Lys(PZ)-OBzy 2.10 grams of decapeptide ester and 700 mg. of BOC-Lys(Z)-nitrophenyl ester are kept in 5 cc. of dimethylformamide for 2 rays at room temperature and for 12 hours at 45° C. The undecapeptide ester derivative is precipitated by the dropwise addition of 250 cc. of ether. Yield: 2.255 grams=93%.

(19) H-Lys(Z)-Pro-Val-Gly-Lys(Z)-Lys(Z)-Arg(Z₂)-Arg(Z₂)-Pro-Val-Lys(PZ)-OBzy

The above product is treated by the method described under (7). Yield: 2.08 grams=96% of the theoretical.

Dinitrophenylation: Carried out as described under (17). In this experiment no ether-soluble dinitrophenylamino acids are obtained; only the water-soluble α-dinitrophenyl-lysine is found.

(20) BOC-Gly-Lys(Z)-Pro-Val-Gly-Lys(Z)-Lys(Z)-Arg(Z₂)-Arg(Z₂)-Pro-Val-Lys(PZ)-OBzy 1.68 grams of the product obtained under (19) are reacted with 230 mg. of BOC-glycine by the method described under (6). Yield: 1.725 grams=97% of the theoretical.

(21) H-Gly-Lys(Z)-pro-Val-Gly-Lys(Z)-Lys(Z)-Arg(Z₂)-Arg(Z₂)-Pro-Val-Lys(PZ)-OBzy 1.725 grams of BOC-dodecapeptide ester are treated by the method described under (7). Yield: 1.592 grams=96% of the theoretical.

Dinitrophenylation: Only ether-soluble dinitrophenylglycin is found but no water-soluble dinitrophenylamino acids.

(22) BOC-Try-Gly-Lys(Z)-Pro-Val-Gly-Lys(Z)-Lys(Z)-Arg(Z₂)-Arg(Z₂)-Pro-Val-Lys(PZ)-OBzy 3.85 grams of dodecapeptide ester derivative and 1.12 grams of BOC-tryptophane are reacted as described under (6). The product is purified by being precipitated from dimethyl-formamide ether. Yield: 4.11 grams of protected tridecapeptide-ester=96% of the theoretical.

(23) H-Try-Gly-Lys(Z)-Pro-Val-Gly-Lys(Z)-Lys(Z)-Arg(Z₂)-Arg(Z₂)-Pro-Val-Lys(PZ)-OBzy 4.0 grams of the above product are treated by the method described under (7). Yield: 3.86 grams=100% of the theoretical.

(24) BOC-Arg(Z₂)-Try-Gly-Lys(Z)-Pro-Val-Gly-Lys(Z)-Lys(Z)-Arg(Z₂)-Arg(Z₂)-Pro-Val-Lys(PZ)-OBzy

The above 3.86 grams of peptide ester are reacted with 2.37 grams of BOC-Arg(Z₂)-OH by the method described under (6). The product is precipitated from dimethylformamide-ether. Yield: 4.40 grams of protected tetradecapeptide ester=96% of the theoretical.

(25) H-Arg(Z₂)-Try-Gly-Lys(Z)-Pro-Val-Gly-Lys(Z)-Lys(Z)-Arg(Z₂)-Arg(Z₂)-Pro-Val-Lys(PZ)-OBzy 4.30 grams of the above BOC compound are treated as described under (7). Yield: 4.15 grams=99% of the theoretical.

Dinitrophenylation: Only water-soluble dinitrophenylarginine is found chromatographically.

(26) BOC-Phe-Arg(Z₂)-Try-Gly-Lys(Z)-Pro-Val-Gly-Lys(Z)-Lys(Z)-Arg(Z₂)-Arg(Z₂)-Pro-Val-Lys(PZ)-OBzy

From 4.15 grams of the above product and 2.14 grams of BOC-phenylalanine-p-nitrophenyl ester there are obtained 4.25 grams of protected pentadecapeptide ester=95% of the theoretical by the method described under (18).

(27) H-Phe-Arg(Z₂)-Try-Gly-Lys(Z)-Pro-Val-Gly-Lys(Z)-Lys(Z)-Arg(Z₂)-Arg(Z₂)-Pro-Val-Lys(PZ)-OBzy

From 4.18 grams of the above BOC compound there are obtained 4.14 grams of pentadecapeptide ester derivative=100% of the theoretical by the method described under (7).

Dinitrophenylation: Only ether-soluble dinitrophenylphenylalanine is obtained.

(28) BOC-His-Phe-Arg(Z)-Try-Gly-Lys(Z)-Pro-Val-Gly-Lys(Z)-Lys(Z)-Arg(Z₂)-Arg(Z₂)-Pro-Val-Lys(PZ)-OBzy

From 4.14 grams of the above product and 1.30 grams of BOC-hisidine there are obtained 4.31 grams (=97% of the theoretical) of protected hexadecapeptide ester by the method described under (6).

(29) H-His-Phe-Arg(Z₂)-Try-Gly-Lys(Z)-Pro-Val-Gly-Lys(Z)-Lys(Z)-Arg(Z₂)-Arg(Z₂)-Pro-Val-Lys(PZ)-OBzy

From 4.20 grams of the above BOC compound there are obtained 3.90 grams of BOC-free hexadecapeptide ester=95% of the theoretical by the method described under (7).

(30) BOC-Glu(OBzy)-His-Phe-Arg(Z₂)-Try-Gly-Lys(Z)-Pro-Val-Gly-Lys(Z)-Lys(Z)-Arg(Z₂)-Pro-Val-Lys(PZ)-OBzy

From the above 3.90 grams and 1.5 grams of BOC-glutamic acid-γ-benzyl ester there are obtained 3.93 grams of the protected heptadecapeptide ester by the method described under (6). Yield: 92% of the theoretical.

(31) H-Glu(OBzy)-His-Phe-Arg(Z₂)-Try-Gly-Lys(Z)-Pro-Val-Gly-Lys(Z)-Lys(Z)-Arg(Z₂)-Arg(Z₂) - Pro - Val - Lys(PZ)-OBzy

From 1.954 grams of the above BOC compound there are obtained 1.957 grams of BOC-free heptadecapeptide ester (100% of the theoretical) by the method described under (7).

Dinitrophenylation: Only dinitrophenylglutamic acid is found.

(32) BOC Met-Glu(OBzy) - His - Phe - Arg(Z₂)-Gly-Lys(Z)-Pro-Val-Gly-Lys(Z)-Lys(Z) - Arg(Z₂) - Arg(Z₂) - Pro-Val-Lys(PZ)-OBzy

From 2.00 grams of the above peptide ester and 752 mg. of BOC-methionine the protected octadecapeptide ester is prepared by the method described under (6). Yield: 1.91 grams=90% of the theoretical.

(33) H-Met-Glu(OBzy) - His - Phe - Arg(Z₂)-Try-Gly-Lys(Z)-Pro-Val-Gly - Lys(Z) - Lys(Z) - Arg(Z₂)-Arg(Z₂)-Pro-Val-Lys(PZ)-OBzy 1.87 grams of the above product are treated by the method described under (7). Yield: 1.88 grams of BOC-free octadecapeptide ester=100% of the theoretical.

(34) BOC-Ser(Bzy) - Met - Glu(OBzy)-His-Phe-Arg(Z₂)-Try-Gly-Lys(Z)-Pro-Val-Gly-Lys(Z)-Lys(Z) - Arg(Z₂) - Arg(Z₂)-Pro-Val-Lys(PZ)-OBzy 1.88 grams of the above product and 797 mg. of BOC-serine (Bzy) are reacted by the method described under (6). Yield: 1.847 grams of protected nonadecapeptide ester=92% of the theoretical.

(35) H-Ser(Bzy) - Met - Glu(OBzy) - His - Phe-Arg(Z₂)-Try-Gly-Lys(Z)-Pro-Val-Gly-Lys(Z) - Lys(Z) - Arg(Z₂)-Arg(Z₂)-Pro-Val-Lys(PZ)-OBzy

The treatment of 1.826 grams of the above product by the method described under (7) yields 1.82 grams of BOC-free nonadecapeptide ester=100% of the theoretical.

(36) BOC - Tyr(Bzy) - Ser(Bzy) - Met - Glu(OBzy)-His-Phe-Arg(Z₂)-Try-Gly-Lys(Z) - Pro - Val - Gly - Lys(Z)-Lys(Z)-Arg(Z₂)-Arg(Z₂)-Pro-Val-Lys(PZ)-OBzy 1.82 grams of the above product are reacted with 1075 mg. of BOC-tyrosine(Bzy) by the method described under (6). Yield: 1.90 grams of protected eicosapeptide ester=96% of the theoretical.

(37) H-Tyr(Bzy) - Ser(Bzy) - Met - Glu(OBzy) - His - Phe-Arg(Z₂) - Try - Gly - Lys(Z) - Pro-Val-Gly-Lys(Z)-Lys(Z)-Arg(Z₂)-Arg(Z₂)-Pro-Val-Lys(PZ)-OBzy 1.885 grams of the above BOC compound are treated by the method described under (7). Yield: 1.91 grams of BOC-free eicosapeptide ester=100% of the theoretical.

(38) BOC - Ser(Bzy) - Tyr(Bzy) - Ser(Bzy)-Met-Glu(OBzy)-His-Phe-Arg(Z₂) - Try - Gly - Lys(Z)-Pro-Val-Gly-Lys(Z)-Lys(Z)-Arg(Z₂)-Arg(Z₂)-Pro-Val-Lys(PZ)-OBzy 1.91 grams of the above peptide ester and 825 mg. of BOC-serine (Bzy) are reacted by the method described under (6). Yield: 1.903 grams of protected heneicosapeptide ester=94% of the theoretical.

(39) H-Ser(Bzy) - Tyr(Bzy) - Ser(Bzy)-Met-Glu(OBzy)-His-Phe - Arg(Z₂) - Try - Gly - Lys(Z) - Pro-Val-Gly-Lys(Z)-Lys(Z)-Arg(Z₂)-Arg(Z₂)-Pro-Val-Lys(PZ)-OBzy

From 1.875 grams of the above BOC-compound the BOC group is split off by treatment with trifluoracetic acid by the method described under (7). The crude product is obtained in the form of a powder by dissolving in boiling alcohol and cooling. Yield: 1.73 grams=94% of the theoretical.

(40) H-Ser-Tyr-Ser-Met-Glu-His-Phe-Arg-Try-Gly-Lys-Pro-Val-Gly-Lys-Lys-Arg-Arg-Pro-Val-Lys-OH 259 mg. of the product described under (39) are stirred in 1 liter of liquid ammonia until dissolution is complete. Small pieces of sodium are added at the boiling point of the ammonia until the blue coloration remains constant. The excess sodium is disintegrated with ammonium acetate and the ammonia evaporated. The residue is dissolved in water, 55 mg. of the starting material remaining behind as a yellow insoluble substance. The aqueous solution is lyophilized and the residue purified in 0.1 N-acetic acid by preparative high-tension electrophoresis (700 volts). The Sakaguchi-positive fractions are combined and lyophilized. Yield: 75.9 mg. of heneicosapeptide. The product shows corticotropic activity.

The starting materials are prepared as follows:

(1) $N^\alpha$-BOC-$N^\omega$:$N^\omega$-dicarbobenzoxy-L-arginine 2.82 grams of $N^\omega$:$N^\omega$-dicarbobenzoxy-L-arginine are stirred in 60 cc. of dioxane and 60 cc. of water with 2.8 grams of magnesium oxide and 1.77 cc. of BOC-azide at 45° C. overnight. The dioxane is evaporated under reduced pressure, the aqueous solution is treated with ethyl acetate and acidified at 0° C. with 2 N-hydrochloric acid. The ethyl acetate extract is washed with water and evaporated. Residue: 2.70 grams of BOC-Arg(Z₂)=72% of the theoretical.

For the purpose of purification, the product is filtered through a column of silica gel (54 grams). The substance eluted with a mixture of chloroform and ethyl acetate (1:1) is recrystallized from a mixture of methanol and water. Yield: 2.21 grams=64% of the theoretical; M.P. 141–143° C.

(2) $N^\alpha$-BOC-$N^\epsilon$-carbobenzoxy-L-lysine-p-nitro-phenyl ester 12.7 grams of BOC-Lys(Z) and 5.5 grams of p-nitrophenol are dissolved in 65 cc. of ethyl acetate and treated at 0° C. with 7.6 grams of dicyclohexyl-carbodiimide. After 5 hours the dicyclohexylurea is filtered off with suction and the ethyl acetate evaporated. The residue is dissolved in methylene chloride and extracted at 0° C. with 0.5-molar potassium carbonate solution. The reaction mixture is washed with hydrochloric acid and water and dried with sodium sulfate; the solvent is evaporated and the residue recrystallized from a mixture of ethanol and water to yield 16.3 grams of BOC-Lys(Z)-ONP=93% of the theoretical; M.P. 91.5–92° C.

(3) BOC-L-Histidine 14.6 cc. of BOC-azide and 110 cc. of N-sodium hydroxide solution are slowly added dropwise to a solution of 19.2 grams of L-histidine-HCl in 100 cc. of 2 N-sodium hydroxide solution and 200 cc. of dioxane. After the reaction mixture has been stirred overnight, the dioxane is evaporated under reduced pressure, the aqueous solution extracted with ethyl acetate and then concentrated to a few cc. under reduced pressure. The solution is covered with butanol, acidified at 0° C. with sulfuric acid and then extracted several times with butanol. After the solvent has been evaporated the butanol extracts yield 15.1 grams=59% of the theoretical of a resin of BOC-His which is paperchromatographically unitary. The product is purified by being precipitated from a mixture of ethanol and ether, a very hydroscopic amorphous powder being obtained.

(4) BOC-L-glutamic acid-γ-benzyl ester

A suspension of 6.9 grams of L-glutamic acid-γ-benzyl ester in 50 cc. of dioxane is treated with 4.45 cc. of BOC-azide. A solution of 6.1 grams of potassium bicarbonate in 50 cc. of water is added dropwise at 45° C. with stirring. The reaction mixture is stirred overnight, the dioxane evaporated under reduced pressure, the aqueous solution extracted with ethyl acetate, then acidified with hydrochloric acid at 0° C. and extracted with ethyl acetate. After washing with water, the ethyl acetate extracts are washed with sodium bicarbonate solution (5%) and water, dried and evaporated. The residue consists of an uncrystallizable oil. Yield: 7.9 grams of BOC-Glu(OBzy)=81% of the theoretical.

The dicyclohexylamine salt crystallizes practically quantitatively from ether or ethyl acetate and a little petroleum ether. M.P. 145–146° C.

(5) BOC-L-phenylalanine-p-nitrophenyl ester 6.2 grams of BOC-L-phenylalanine, 3.9 grams of p-nitrophenol and 25 cc. of absolute ethyl acetate are treated at 0° C. with 5.3 grams of dicyclohexyl-carbodiimide. The reaction mixture is allowed to stand overnight at 0° C. The nitrophenyl ester which has crystallized out is dissolved by gentle heating, the dicyclohexyl-urea is then filtered with suction and the filtrate evaporated to dryness under reduced pressure. After recrystallization from ethanol there are obtained 6.1 grams=69% of the theoretical of the nitrophenyl ester melting at 130–132° C. The analytically pure product melts at 135° C.

(6) BOC-O-benzyl-L-serine 10.8 grams of O-benzyl-L-serine-methyl ester-D-hydrogen tartrate are treated with 23 cc. of 4 N-sodium hydroxide solution. After 15 minutes the resulting solution is adjusted to pH 6 with glacial acetic acid. The crystalline O-benzyl-L-serine is filtered with suction, washed with water to yield 4.95 grams=84% of the theoretical. The product is dissolved in 25.4 cc. of N-sodium hydroxide solution and 25 cc. of dioxane and treated at 45° C. with 3.88 cc. of BOC-azide and slowly treated with 28 cc. of N-sodium hydroxide solution. The reaction mixture is stirred overnight, the dioxane evaporated under reduced pressure, the aqueous solution extracted with ethyl acetate, then acidified at 0° C. with hydrochloric acid and again extracted with ethyl acetate. The ethyl acetate extracts are evaporated under reduced pressure, treated with 4.2 cc. of dicyclohexylamine, brought to crystallization with petroleum ether and the salt suction-filtered. Yield: 8.2 grams of dicyclohexylamine salt=68% of the theoretical; M.P. 134–135° C.

The dicyclohexylamine salt is dissolved in water with heating, covered with ethyl acetate, cooled to 0° C. and acidified with 2 N-hydrochloric acid. The ethyl acetate solution is again washed with hydrochloric acid, then with water, dried and evaporated. BOC - O - benzyl-L-serine forms an oil. The yield is quantitative.

What is claimed is:

1. Tertiary-butyloxycarbonyl - L - seryl - L - tyrosyl-L-seryl-L-methionyl - L - glutaminyl - L - histidyl-L-phenylalanyl-L-arginyl-L - tryptophyl-glycyl-ε-tertiary butyloxycarbonyl-L-lysyl-L-prolyl-L - valyl-glycyl-ε-tertiary butyloxy carbonyl-L-lysyl-ε-tertiary butyloxycarbonyl-L-lysyl-L-arginyl-L-arginyl-L-proline.

2. Carbobenzoxy-L-valyl-ε - tertiary butyloxycarbonyl-L-lysine methyl ester.

3. ε-para-phenylazobenzyloxy carbonyl-L-lysine benzyl ester.

4. Tertiary-butyloxycarbonyl-L - valyl-N$^\epsilon$-para-phenylazobenzyloxycarbonyl-L-lysine benzyl ester.

5. L-valyl-N$^\epsilon$ - para - phenylazobenzyloxycarbonyl-L-lysine-benzyl ester.

6. Tertiary-butyloxycarbonyl - L-prolyl-L-valyl-ε-para-phenylazobenzyloxycarbonyl-L-lysine benzyl ester.

7. L-prolyl-L-valyl - ε - para - phenylazobenzyloxy-carbonyl-L-lysine benzyl ester.

8. Tertiary butyloxycarbonyl - ε - dicarbobenzoxy-L-arginine.

9. Tertiary butyloxycarbonyl - ε-carbobenzoxy-L-lysine para-nitrophenyl ester.

10. Tertiary butyloxycarbonyl - L - valyl-glycine ethyl ester.

11. Tertiary butyloxycarbonyl-L-valyl glycine.

12. Tertiary butyloxycarbonyl - L - glutamic acid - γ-benzyl ester.

13. Tertiary butyloxy carbonyl-L-phenylalanine-para-nitrophenyl ester.

14. Tertiary butyloxycarbonyl-L-histidine.

15. Tertiary butyloxycarbonyl-O-benzyl-L-serine.

16. A member selected from the group consisting of

L-seryl-L-tyrosyl-L-seryl-L-methionyl-L-glutaminyl-
  L-histidyl-L-phenylalanyl-L-arginyl-L-tryptophyl-
  glycyl-L-lysyl-L-prolyl-L-valyl-glycyl-L-lysyl-L-
  lysyl-L-arginyl-L-arginyl-L-prolyl-L-valyl-
  L-lysine and
L-seryl-L-tyrosyl-L-seryl-L-methionyl-L-glutamyl-
  L-histidyl-L-phenylalanyl-L-arginyl-L-tryptophyl-
  glycyl-L-lysyl-L-prolyl-L-valyl-glycyl-L-lysyl-L-
  lysyl-L-arginyl-L-arginyl-L-prolyl-L-valyl-L-lysine, its derivatives selected from the group consisting of esters, amides and hydrazides and salts of therapeutically useful acids.

References Cited by the Examiner

Harris: Nature, vol. 178, page 90 (1956).
Hoffman et al.: J.A.C.S., vol. 83, pages 2286–99, May 20, 1961.
Hoffman et al.: J.A.C.S., vol. 82, pages 3715–21 (1960).
Hoffman et al.: J.AC.S., vol. 79, pages 1636–41 and 6087–88 (1957).
Schwyzer: Nature, vol. 182, pages 1669–70 (1958).
Shepherd: J.A.C.S., vol. 78, pages 5067–76 (1956).
White: J.A.C.S., vol. 77, pages 1711 and 12 (1955).

LEWIS GOTTS, *Primary Examiner.*

CHARLES B. PARKER, *Examiner.*

DENNIS P. CLARKE, PERRY A. STITH,
*Assistant Examiners.*